United States Patent
Gabel et al.

(10) Patent No.: US 9,676,654 B2
(45) Date of Patent: Jun. 13, 2017

(54) METHOD FOR PRODUCING ANGLED GLASS CERAMIC COMPONENTS

(75) Inventors: Falk Gabel, Schlangenbad (DE); Oliver Muehlke, Geisenheim (DE)

(73) Assignee: SCHOTT AG, Mainz (DE)

(*) Notice: Subject to any disclaimer, the term of this patent is extended or adjusted under 35 U.S.C. 154(b) by 704 days.

(21) Appl. No.: 13/255,690

(22) PCT Filed: Feb. 1, 2010

(86) PCT No.: PCT/EP2010/051147
§ 371 (c)(1),
(2), (4) Date: Nov. 17, 2011

(87) PCT Pub. No.: WO2010/102858
PCT Pub. Date: Sep. 16, 2010

(65) Prior Publication Data
US 2012/0058303 A1 Mar. 8, 2012

(30) Foreign Application Priority Data
Mar. 10, 2009 (DE) .................. 10 2009 012 018

(51) Int. Cl.
*C03B 23/03* (2006.01)
*C03C 10/00* (2006.01)

(52) U.S. Cl.
CPC ... *C03B 23/0305* (2013.01); *Y10T 428/24355* (2015.01)

(58) Field of Classification Search
CPC ... C03B 32/02; C03B 23/023; C03B 23/0258; C03B 23/03; C03B 23/0256; C03B 23/0302; C03B 23/0307; C03B 23/0357; C03B 29/025; C04B 35/00

USPC .................................................. 65/104–106
See application file for complete search history.

(56) References Cited

U.S. PATENT DOCUMENTS

| | | | | |
|---|---|---|---|---|
| 2,215,228 A | * | 9/1940 | Oliver | C03B 23/0258 65/107 |
| 3,387,962 A | * | 6/1968 | Whitmire | C03B 23/0258 65/104 |
| 4,002,450 A | * | 1/1977 | Hamilton | C03B 23/027 65/107 |
| 4,059,428 A | | 11/1977 | Andrews | |

(Continued)

FOREIGN PATENT DOCUMENTS

DE  10039027 C1  1/2002
DE  10047576  4/2002

(Continued)

OTHER PUBLICATIONS

Latterman et al. DE 10047576 Machine Translation as viewed at http://www.google.ee/patents/DE10047576A1?cl=en onJul. 21, 2014.*

(Continued)

*Primary Examiner* — Jodi C Franklin
(74) *Attorney, Agent, or Firm* — Ohlandt, Greeley, Ruggiero & Perle, L.L.P.

(57) ABSTRACT

A method for creating a glass ceramic component having at least one angle is provided, where the angle is formed as a transition between two legs. The angle is made with a bending radius in the range between 30 mm and 200 mm during conversion of the glass plate in a green glass state to the glass ceramic plate under the effects of a deformation tool.

15 Claims, 7 Drawing Sheets

(56) References Cited

U.S. PATENT DOCUMENTS

| | | | | |
|---|---|---|---|---|
| 4,081,263 | A | * | 3/1978 | Mestre ................ C03B 23/0256 65/106 |
| 4,203,751 | A | * | 5/1980 | Roth ....................... C03B 35/20 65/106 |
| 4,217,126 | A | * | 8/1980 | Hagedorn ................ C03B 23/03 65/106 |
| 4,399,089 | A | * | 8/1983 | Mohri ................... C04B 41/009 264/132 |
| 4,496,386 | A | * | 1/1985 | Hymore ................. C03B 23/03 65/104 |
| 4,789,771 | A | * | 12/1988 | Robinson .............. C30B 25/105 118/730 |
| 4,804,397 | A | * | 2/1989 | Stas .................... C03B 23/0256 65/106 |
| 4,909,820 | A | * | 3/1990 | Hirotsu ................ C03B 23/027 65/106 |
| 5,045,101 | A | * | 9/1991 | Hirotsu ................ C03B 23/027 65/106 |
| 5,178,659 | A | * | 1/1993 | Watanabe ........... C03B 23/0235 65/106 |
| 5,383,990 | A | * | 1/1995 | Tsuji ................. B32B 17/10036 156/102 |
| 5,649,990 | A | * | 7/1997 | Frank ................. C03B 23/0305 65/106 |
| 5,849,057 | A | * | 12/1998 | Didelot ............... C03B 23/0256 65/106 |
| 5,968,219 | A | * | 10/1999 | Gille et al. ....................... 65/33.8 |
| 6,103,338 | A | * | 8/2000 | Gille ..................... C03B 23/023 126/37 A |
| 6,120,282 | A | | 9/2000 | Vilato et al. |
| 6,158,247 | A | * | 12/2000 | Didelot ............... C03B 23/0256 65/106 |
| 7,000,430 | B1 | | 2/2006 | Fotheringham et al. |
| 8,156,764 | B2 | * | 4/2012 | Machura ............... C03B 23/027 65/273 |
| 8,281,619 | B2 | * | 10/2012 | Dannoux ............ C03B 23/0305 65/102 |
| 8,833,106 | B2 | * | 9/2014 | Dannoux ............ C03B 23/0256 65/106 |
| 9,284,212 | B2 | * | 3/2016 | Dannoux ............ C03B 23/0235 |
| 9,376,337 | B2 | * | 6/2016 | Odani ................... G06F 1/1626 |
| 2002/0020192 | A1 | | 2/2002 | Bader et al. |
| 2005/0183456 | A1 | | 8/2005 | Taplan et al. |
| 2005/0183459 | A1 | * | 8/2005 | Schroeder ........... C03B 23/0357 65/268 |
| 2008/0184740 | A1 | * | 8/2008 | Waldschmidt ........ C03B 23/023 65/17.2 |
| 2009/0155533 | A1 | | 6/2009 | Nuettgens et al. |
| 2010/0077798 | A1 | | 4/2010 | Fredholm et al. |
| 2012/0040142 | A1 | * | 2/2012 | Muehlke ............. C03B 23/0256 428/174 |

FOREIGN PATENT DOCUMENTS

| | | |
|---|---|---|
| DE | 10102576 | 8/2002 |
| DE | 10344444 | 5/2005 |
| EP | 0640569 | 3/1995 |
| EP | 0879797 | 11/1998 |
| EP | 1143483 A1 | 10/2001 |
| EP | 1967499 A1 | 9/2008 |
| FR | 2812867 | 2/2002 |
| FR | 2860228 | 4/2005 |
| FR | 2866642 | 8/2005 |
| FR | 2909372 | 6/2008 |
| GB | 2284655 | 6/1995 |
| GB | 2379659 A | 3/2003 |
| JP | 2002-104835 A | 4/2002 |
| JP | 2002540048 A | 11/2002 |
| JP | 2004309021 | 11/2004 |
| JP | 2005-097109 A | 4/2005 |
| WO | WO93/00305 | 1/1993 |
| WO | WO2005/042420 | 5/2005 |

OTHER PUBLICATIONS

DE10047576 Method for Shaping of Glass Ceramic Parts and/or Glass Parts, Translated by: Phoenix Translations, United States Patent and Trademark Office Washington, D.C. Oct. 2016.*
International Search Report dated Apr. 7, 2010 corresponding to International Patent Application No. PCT/EP2010/051147.
International Preliminary Report on Patentability dated Sep. 20, 2011 corresponding to International Patent Application No. PCT/EP2010/051147.
English translation of the Written Opinion of the International Searching Authority dated Apr. 7, 2010 corresponding to International Patent Application No. PCT/EP2010/051147, 8 pages.

* cited by examiner

METHOD FOR PRODUCING ANGLED GLASS CERAMIC COMPONENTS

The invention relates to a method for producing a glass ceramic component with at least one angle, wherein the angle is formed as a transition between two legs.

In addition, the invention relates to a glass ceramic component with at least one angle, which is disposed between two legs, the legs enclosing an included angle.

A glass ceramic is a special material, which is produced by targeted and temperature-controlled crystallization, so-called ceramicizing, usually from a plate-shaped glass that is first melted in a melting tub. Characteristic properties of a glass ceramic are resistance to change at high temperatures as well as a very small thermal expansion. Glass ceramics are used, e.g., in hotplates, as cooktops, as oven or furnace lining, as cover panes for radiant heating units, as viewing windows for all ovens or furnaces that are used for heating, as viewing panes in general in combustion units, including vehicle inspection windows, which are usually characterized by a high resistance to bombardment, or also even for lighting purposes (reflectors) and applications in astronomy.

Angled viewing panes for fireplaces or ovens that are primarily produced by means of gas-operated bending units and having very small bending radii of approximately 10 mm are known from the prior art. In this case, the glass ceramic plates to be shaped are bent in the non-ceramicized state, i.e., as glass in an additional process downstream to the hot forming prior to the actual ceramicizing.

For example, this type of bending method is known from WO 2005/042420 A1, in which the edge of a glass plate is heated on at least one side up to the softening point of the glass with an oscillating line burner. Subsequently, the glass edge projecting out over the low-viscous edge is bent into a pre-determined angle along the bending edge as a leg of the glass molded part and subsequently cooled.

Another known possibility for producing angled glass ceramic panes is gravity sinking by weight during the ceramicizing process. Angled glass ceramic panes with radii greater than approximately 200 mm can be produced directly in the ceramicizing furnace by gravity sinking by weight.

Such a method for producing bent glass ceramic articles is known from DE 10 102576 A1, in which a plate-shaped green-glass object is placed at room temperature on a ceramicizing mold, which has a mold surface adapted to the geometric structure of the bent glass ceramic object. For this purpose, the ceramicizing mold has an arc-shaped sunken central part corresponding to the arc to be formed. For ceramicizing, the green-glass plate is first heated to the ceramicizing temperature. In this way, the initially dimensionally stable green-glass plate enters a viscous state, whereupon the part of the green-glass plate found above the central part of the mold sinks due to gravity and is applied to the arc-shaped mold surface. This type of gravity sinking by weight is relatively time-consuming based on the slow sinking speed typical for the material and the process, so that a particularly high throughput cannot be achieved.

The bending radii that can be produced by this method are dependent on the glass thickness, the included angle and the viscosity-time curve of the glass ceramic material. Added to this is the fact that an increasing thickness due to the bending moment unfavorably influences the sinking of the green glass in the mold, i.e., this method of gravity sinking is continually more difficultly feasible with increasing glass thickness.

Bending radii of less than 200 mm cannot be produced with this method, since the residence time attained with it in the ceramicizing process is insufficient for the low viscosity of the glass required for the deformation.

Angled glass ceramic panes with bending radii typically of down to 54 mm can be bent in a separate bending unit by means of gas burners in the unceramized state and can then be ceramicized in a downstream process step in the ceramicizing furnace. The bending of radii greater than 54 mm is technically possible by means of a gas-operated bending unit, but is only feasible with high expenditure for this unit.

It is now the object of the invention to indicate a method for producing angled glass ceramic components, the method making possible a simplified and accelerated bending process. Bending radii in the range of about 30 mm-200 mm also can be produced in a simple and cost-effective manner by the indicated method. In addition, it is the object of the invention to provide a glass ceramic component that is characterized by an attractive visual appearance. The invention additionally has the object of deforming so-called pre-seeded glass components corresponding to specifications. "Pre-seeded glass components" are to be understood as green glasses that already have a certain crystal-phase fraction after heat forming. This crystal phase is approximately between 1 and 10% of the total phase fractions and thus shortens the low-viscosity residence time needed for the deformation.

This object of the invention is accomplished by a method for producing angled glass ceramic components with the features of claim 1 and by a glass ceramic component with the features of claim 7. Advantageous enhancements are described in each of the subclaims.

It is provided according to the method that the angle with a bending radius in the range between 30 mm and 200 mm is formed during the ceramicizing process by converting the glass plate found in the green glass state into the glass ceramic plate under the action of a shaping tool. Accordingly, the shaping process for producing the angle takes place in the ceramicizing process, which makes possible optimizing the time involved in the manufacture. In this case, the heating of the glass plate in the green glass state that is required for the ceramicizing (and also belonging to the ceramicizing process) is utilized. During this heating phase, the glass plate must be heated to a temperature state in which it reaches a viscosity state that permits a shaping. Upon reaching this viscosity state, a very limited time window opens up for the process of shaping, since the ceramicizing (or more precisely: the volume crystallization of the glass) then also ensues. After reaching a certain degree of ceramicizing, a shaping is no longer possible. A shaping force, which brings about the production of the angle with a radius between 30 and 200 mm within the narrow process window, is now introduced into the glass material with the shaping tool according to the invention.

According to a preferred embodiment of the invention, it is provided that a bending angle for the angling is produced in the range between 0° and 179°, preferably between 60° and 150°. Such a bending angle can be produced with very good surface quality of the entire glass ceramic component during the ceramicizing process.

In order to assure a stable shaping process and also to guarantee a deformation-free geometry, it can be provided according to the invention that the legs connecting to the angle have a leg length in the range between 1 and 1000 mm, preferably between 50 and 600 mm, or that a height of the glass part between 10 and 1000 mm, preferably in the range between 200 and 800 mm, is produced in the direction of the bending axis. Leg lengths in the range between 50 and 600 mm guarantee an extremely small transverse deformation. Heights of the glass part in the range between 200 and 800 mm guarantee a support length sufficient for the shaping.

A preferred variant of the invention for a time-optimized manufacture is characterized in that during the ceramicizing process, a heating phase is conducted during which the glass plate is heated up to a ceramicizing temperature, and in that the angle is then formed prior to reaching this ceramicizing temperature, when the glass plate has a viscosity that is sufficient for the deformation, for example 10e12 (also including this value, of course) to 10e7 d Pa s.

The shaping takes place particularly simply when it is provided that the glass plate is placed by its outer side onto two support plates, that at least two lower holders are set up on the inner side of the glass plate and each of these is paired with one of the support plates, and that by means of an adjustment mechanism, the two support plates are mutually pivoted when a viscosity that is sufficient for deforming the glass plate has been attained. The support plates thus react to the reduction in the viscosity of the glass plate as a consequence of the ceramicizing process and the pressure of the lower holders.

Accordingly, it can be particularly provided that two support plates, each of which takes up one leg of the glass plate, are disposed on both sides of a predetermined bending edge of the glass plate and are mutually pivoted around a pivoting axis extending parallel to the bending edge of the glass plate, for example, this pivoting being caused by gravity or by action of clamping forces. On the side of the glass plate turned away from the support side of the glass plate, at least two lower holders are disposed on both sides of the bending edge. In this way, the lower holders introduce a force directed in the direction onto the glass plate during the deforming.

The glass plate to be deformed can be simply loaded into the bending device. In the loaded state, it can then be completely introduced into a furnace, in which the glass plate is converted into a viscous state by heating. Due to the pivoting of the support plates, the bending device makes possible an accelerated deformation, in which the bending edge of the glass plate equally serves as a hinge between the two legs of the glass plate.

Each of the lower holders can be disposed in the region of the two tangent lines between the legs of the glass plate and the bending radius to be adjusted in the deformation. In this case, the distance between the lower holders relative to one another can correspond essentially to the arc length of the region to be deformed taking into consideration the thermal expansion and the material shrinkage.

In order to hold the glass plate to be deformed stably on the support plates, a stop for the free ends of the glass plate to be deformed can be disposed at the ends of the support plates facing away from the bending edge of the glass plate.

A particularly stable attachment can be achieved by inclining the two support plates by a small angle of inclination with the glass plate in place. This has the consequence that the stop pieces exercise a compressive force on the free ends of the glass plate to be deformed, the force being directed in the direction onto the bending edge.

In order to limit the pivoting motion of the support plates during the deformation process, stops can be provided for each of these.

The object of the invention relating to the glass ceramic component is accomplished in that the angle region on the outer side facing away from the included angle has a surface waviness with an Ra value of <10 μm at least along a measurement path in the range of at least ±35% of the plate path in the direction of the bending axis, measured from the center of the plate.

If the long waviness of the glass ceramic article were to be left unconsidered, then the Ra value of less than 10 μm would be valid for the entire course of the bending seam. The long waviness has no effect on the visual evaluation of the waviness in the region of the bending seam. Therefore, the Ra value is the essential quality feature of the product that can be attributed to this novel method.

The glass ceramic component thus possesses a surface quality that is perceived as smooth and not wavy by the observer due to light refraction effects in the region of the angle. Thus an optically homogeneous transition results between the legs and the angle.

With a plate dimension of 400 mm, for example, in the direction of the bending axis, there results a measurement path of 280 mm, which extends equal distances on both sides of the center of the plate (approx. 140 mm).

The above-named surface waviness with the indicated wave amplitude and/or periodicity, in particular, can be produced with small manufacturing expense by the method according to claim 1.

Complex components of good quality can also be produced with the invention. For example, it can be provided that a first and a third leg are each connected to a second leg by means of an angle.

An ideal strength structure results for the glass ceramic component in that the material microstructure of the legs and the angle are substantially identical.

No change in the glass thickness or only a small change arises in the deformation region with the method of the invention. Very smooth surfaces are also obtained in the bending region without the waviness of the surface that is typical for bending that is produced with gas burners due to inhomogeneous heating of the bending region. A deformation can also be produced in this case with very rapidly ceramicizing glass ceramics.

The invention will be explained in further detail in the following on the basis of examples of embodiment shown in the drawings.

Herein:

Figure 1:
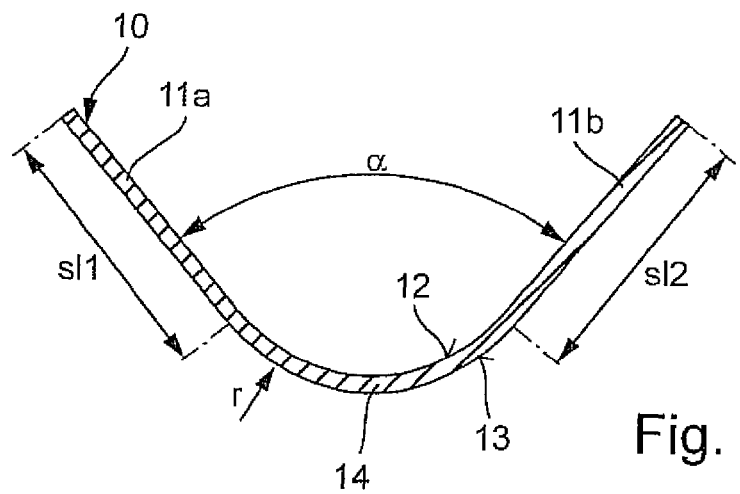
FIG. 1 shows a glass ceramic component in lateral view and in section.
Figure 3:
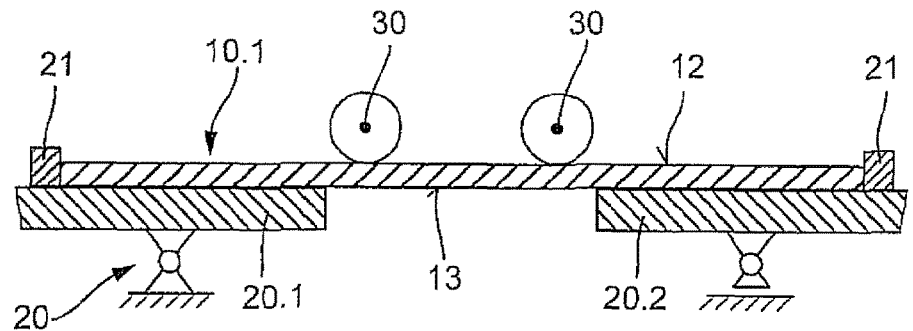
Figure 4:
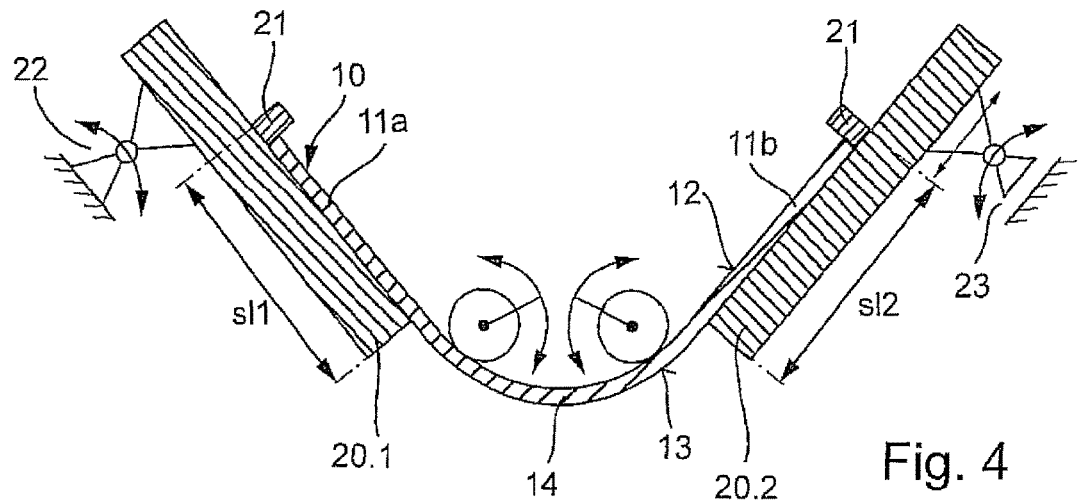
Figure 5:
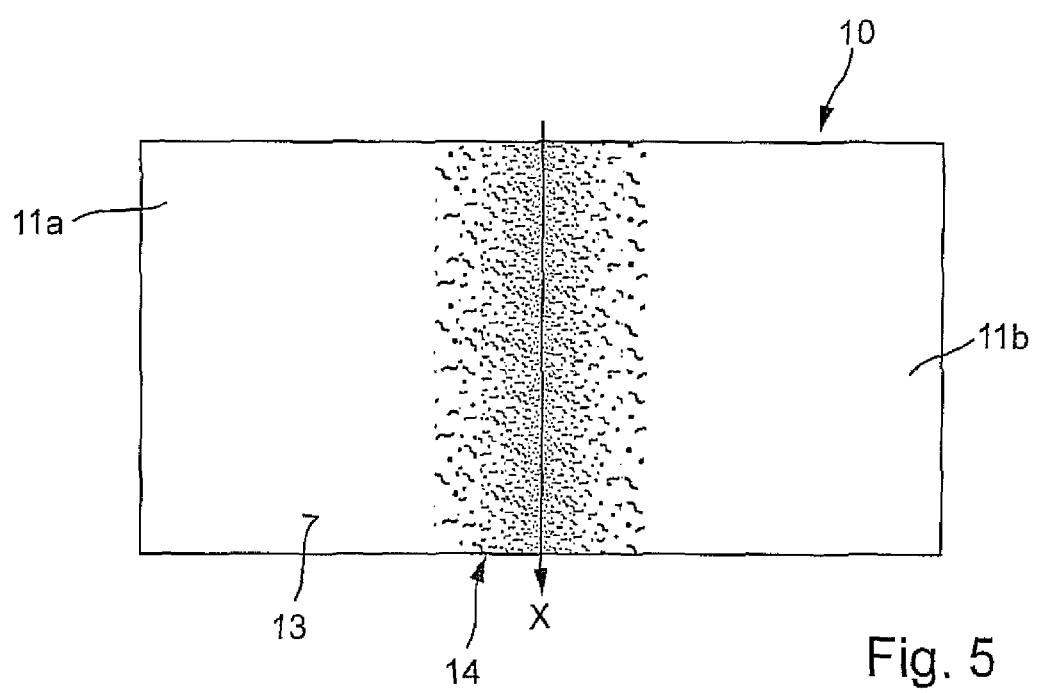
Figure 6:
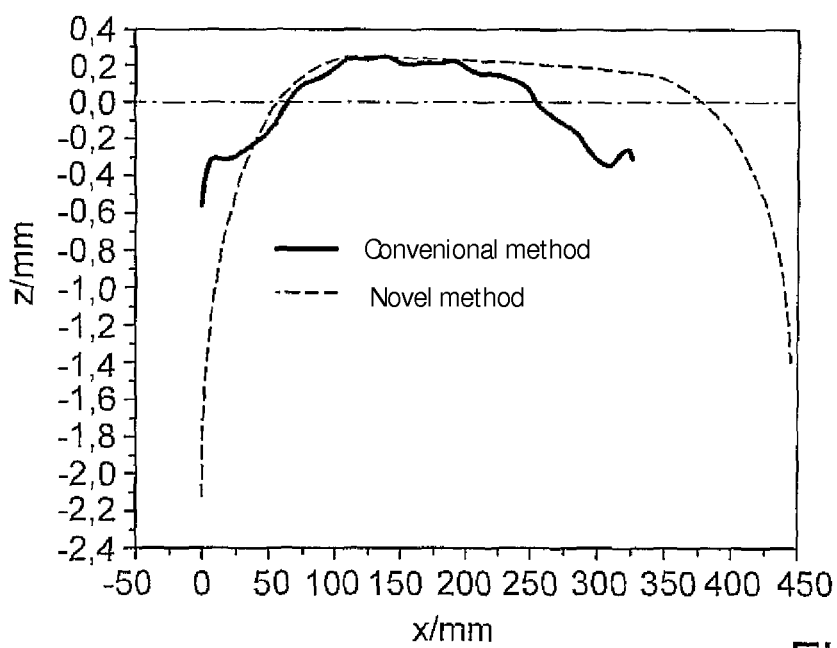
Figure 7:
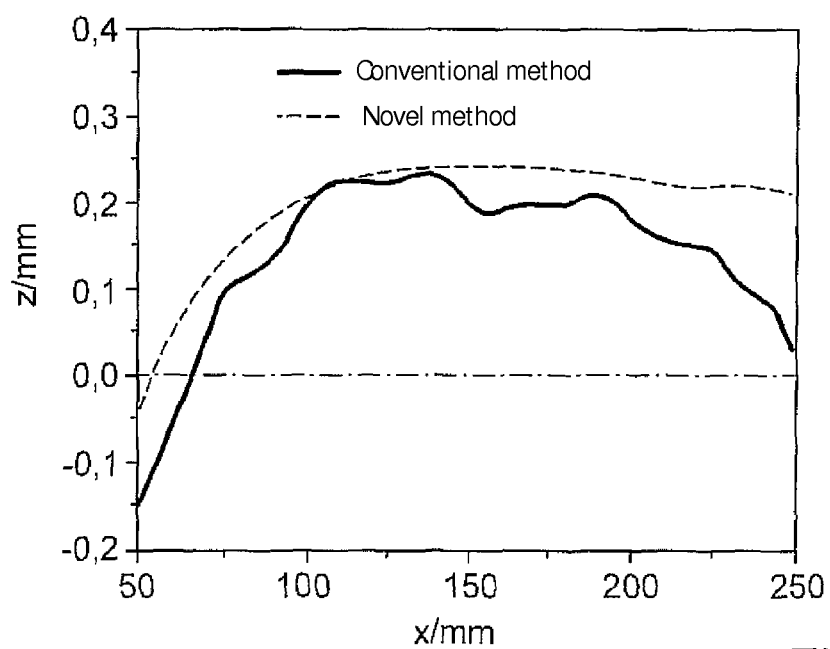
Figure 8:
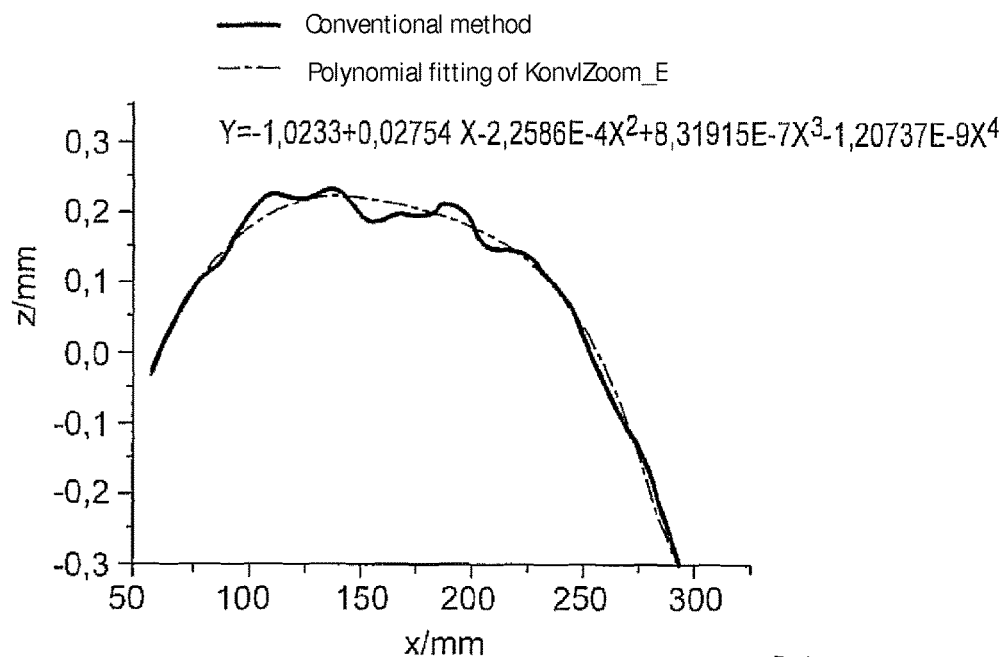
Figure 9:
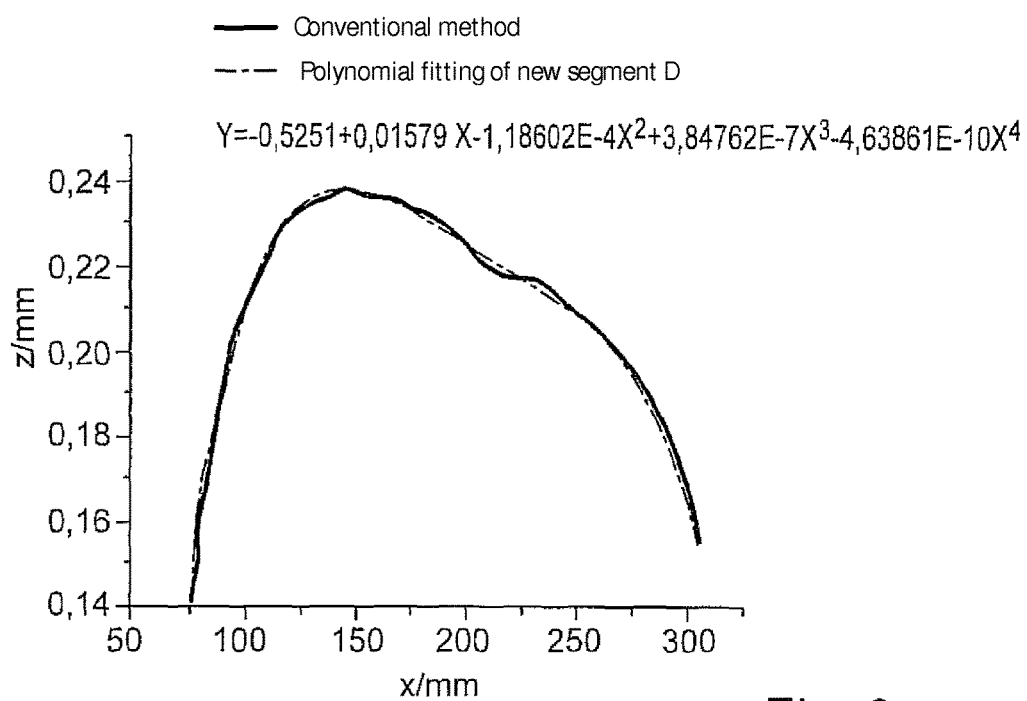
Figure 10:
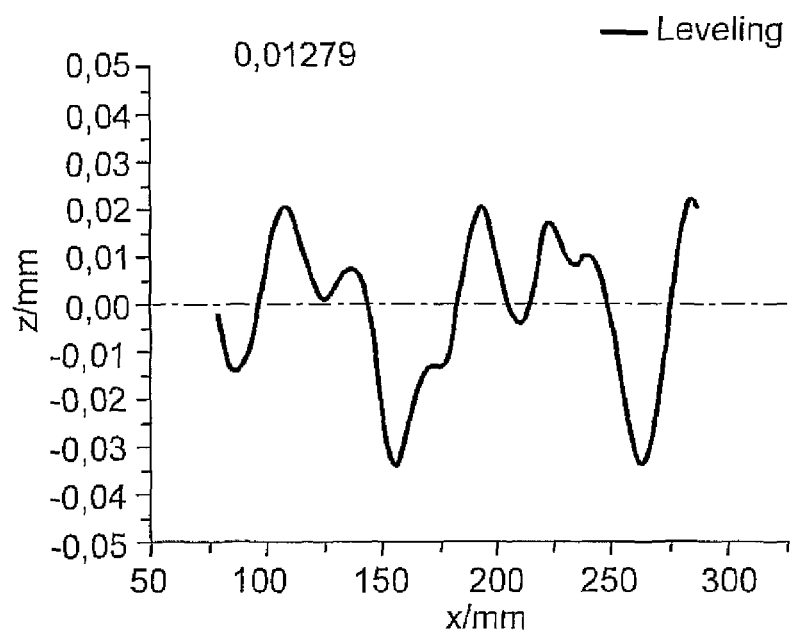
Figure 11:
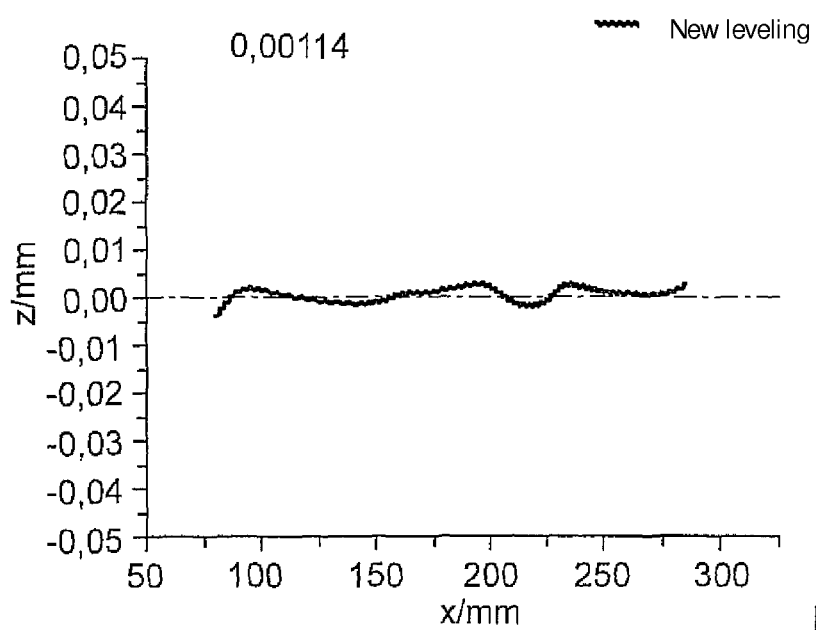
Figure 12:
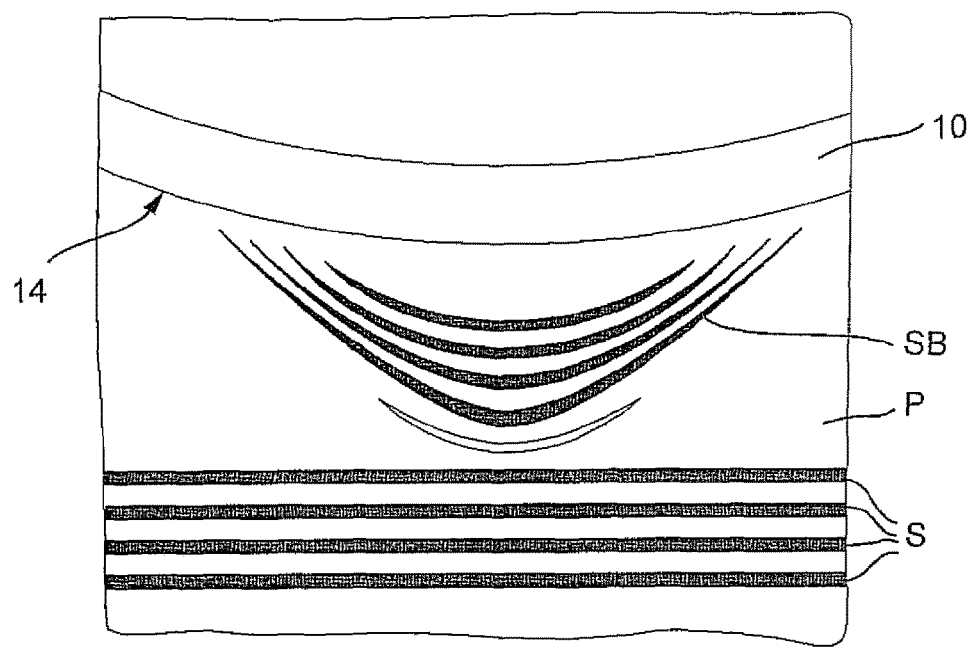
Figure 13:
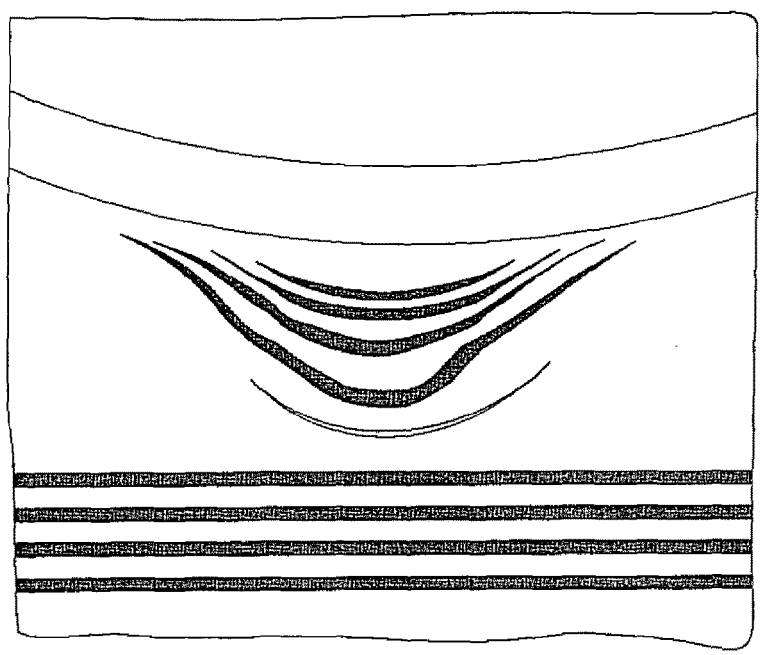

FIG. 3 shows a schematic representation of a shaping tool with a glass plate attached thereto, FIG. 4 shows the shaping tool according to FIG. 3 in a changed operating position, FIG. 5 shows a top view onto the glass ceramic component shown in FIG. 1, FIG. 6 shows a diagram that illustrates both a surface profile of a glass ceramic component according to the prior art as well as according to a glass ceramic component according to the invention, FIG. 7 shows a detail view taken from FIG. 6 in an enlarged representation, FIGS. 8 and 9 show diagrams with a surface profile according to the prior art and according to the invention according to FIG. 7, with a superimposed polynomical curve in each case, FIGS. 10, 11 show a resulting curve formed by subtraction between the surface profile and the polynomial curve according to FIGS. 8 and 9, FIG. 12 shows a photo-realistic representation of the glass ceramic component according to the invention according to FIG. 1 and FIG. 13 shows a photo-realistic representation of a glass ceramic component according to the prior art.

FIG. 1 shows a glass ceramic component 10, which has two legs 11a, 11b, which are joined together to form one part by means of an angle 14. The two legs 11a, 11b enclose the included angle α on the inside of the glass ceramic component 10. On the outer side 13, the glass ceramic component 10 forms a convex contour, which presently has the constant bending radius r, in the region of the angle 14. The legs 11a, 11b have an identical leg length sL1, sL2.

Figure 2:
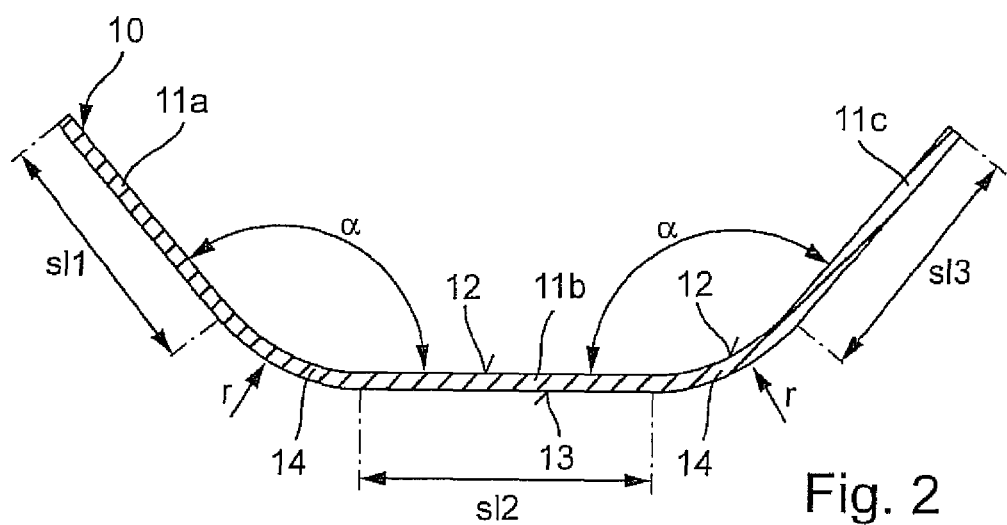
FIG. 2 shows another glass ceramic component in lateral view and in section.

In the example of embodiment according to FIG. 2, a glass ceramic component 10 is shown, which has three legs 11a, 11b, 11c with the leg lengths sL1, sL2, sL3. The legs 11a and 11c are each connected on their ends to the leg 11b via an angle 14. An included angle α is enclosed each time between the legs 11a, 11b, 11c in the region of the inner side 12, whereby the included angles α are identical in the present case. On the outside, there again results a bending radius r at the angles 14.

The glass ceramic components 10 have a component height of preferably 200 to 600 mm in the direction perpendicular to the plane of the figure according to FIG. 1 and FIG. 2.

FIG. 3 shows schematically a shaping tool for producing the glass ceramic component 10 according to FIG. 1. The shaping tool has two support plates 20.1 and 20.2.

A glass plate 10.1 in the green glass state is placed on these support plates 20.1 and 20.2. The glass plate 10.1 lies with its outer side 13 flat on the upper side of the support plates 20.1 and 20.2. The lengthwise ends of the glass plate 10.1 are set in position by means of two stops 21, taking into consideration the possible lengthwise expansion during the heating process. Two roller-shaped lower holders 30 are positioned on the upper side 12 of the glass plate 10.1. The central lengthwise axes of the lower holders 30 run in the direction perpendicular to the figure plane and thus along the bending axis and the component width.

The composite system according to FIG. 3 is placed in a ceramicizing furnace and heated therein to the ceramicizing temperature. During the heating process, the glass plate 10.1 is brought to a temperature state that makes possible a deformation. Then the shaping tool is inserted and the two support plates 20.1 and 20.2 are inclined by an angular range corresponding to the angle 14.

The left support plate 20.1 is coupled so that it can be pivoted on a pivoting bearing 22. The right support plate 20.2 is coupled to a bearing 23, which conducts a combined pivoting and displacement movement, as this is indicated by the double arrow on bearing 23. After the shaping has been produced, the geometry shown in FIG. 1 results. After concluding the ceramicizing, the combined system according to FIG. 4 is removed from the ceramicizing furnace and cooled. Then the finished glass ceramic component 10 can be removed. The glass ceramic component 10 is characterized by an excellent surface quality, as will be explained below:

FIG. 5 shows a top view onto the glass ceramic component 10 according to FIG. 1. In this case, the convex side of the angle 14 is facing the observer. The convex angle 14 is depicted by the shading.

An axis x that runs in the direction of the bending axis is plotted exactly in the center region of the glass ceramic component 10. A stylus of a waviness profile measuring device is guided along this axis x on the outer side 13 of the glass ceramic component 10.

FIG. 6 shows the measured contour of a glass ceramic component 10, which is manufactured according to the prior art and which has the same structural form as FIG. 1 (solid line) and in comparison to this, a surface waviness profile of a glass ceramic component 10 according to the invention (dotted line). The x-value is measured along the x-axis shown in FIG. 5. On the y-axis of the diagram is plotted the deflection of the stylus perpendicular to the x-axis (Z value). As can be recognized in FIG. 6, macroscopically considered U-shaped curves result for the measured contours. This results from the fact that in producing the angle 14, the edges of the glass ceramic component are easily arched. This macroscopic effect will remain unconsidered as long waviness in considering the surface waviness and can be subtracted by means of a common polynomial calculation (polynomial fitting) in the determination of the standardized roughness value Ra (see FIGS. 8 and 9).

In order to clearly determine the fine waviness, the long-wave fraction must be removed from the measurement data. This is carried out by fitting the measurement data to a simple and suitable function (FIG. 8 dotted line for the prior art, and FIG. 9 for the embodiment according to the invention). Fast Fourier filtering (low-pass and high-pass filtering) was dispensed with, since it can introduce more sources of error due to its complexity than it can contribute to the revealing of actual information. In principle, however, the fitting and subtracting correspond to a long waviness of the high-pass filtering.

If the curves shown in FIGS. 8 and 9 are subtracted from one another, one obtains the diagrams according to FIGS. 10 and 11.

If one calculates from this the raw arithmetic mean of the waviness (arithmetic mean of the contributions of all profile values, i.e., summing the contributions of all deviations from the zero line divided by the number of deviations), then one recognizes that in the case of the glass ceramic component according to the prior art, the roughness is clearly more pronounced than in the case of the glass ceramic component according to the invention.

In particular, an Ra value of <10 μm can be produced with the manufacturing method according to the invention, as this can be clearly recognized from the figures.

A clearly improved visual quality of the component results in the region of angle 14 with hardly any or no perceivable surface waviness.

Refer to FIGS. 12 and 13 for the illustration of the quality advantage of the glass ceramic component 10 according to the invention. FIG. 12 shows a glass ceramic component according to the invention according to FIG. 1, which is placed on a horizontal white plate P. In this case, only the region of angle 14 is shown in FIG. 12. Four strokes S are recorded on plate P in front of the angle 14. If one now considers the plate P under a small angle (for example, 10°-15°), then the mirror image SB of stroke S is produced in front of the angle 14. This mirror image SB thus shows the warp-free contour of angle 14.

FIG. 13 shows the same arrangement as FIG. 12, but with a glass ceramic component 10 according to the prior art. It can be clearly seen that the mirror image SB of stroke S is clearly warped due to the highly wavy surface structure.

The invention claimed is:

1. A method for producing a glass ceramic component, wherein the glass ceramic component comprises two legs, each having a length from 50 mm to 600 mm, a bending radius from 30 mm to 200 mm, and an angle between the two legs from 60° to 150°, the method comprising the steps of:

placing an outer side of a green glass plate flat on an upper side of two support plates and lengthwise ends of the green glass plate set in position by two stops that taking into consideration possible lengthwise expansion due to heating;

positioning two roller-shaped holders on an upper side of the green glass plate, the two support plates having central lengthwise axes that run along a bending axis;

heating the green glass plate up during a ceramicizing process to a temperature below a ceramicizing temperature to a viscosity sufficient for deformation;

mutually pivoting the two support plates during the heating step of the ceramicizing process when the viscosity sufficient for deformation has been attained, and wherein the glass plate is in a pre-nucleated state having a crystal-phase fraction between 1 and 10% of the total phase fraction, but below the ceramicizing temperature while maintaining contact between the two support plates and the outer side of the green glass plate with the two stops exercising a compressive force on the lengthwise ends of the green glass plate to form the angle with a bending radius; and continuing the heating step of the ceramicizing process to heat the green glass plate up to the ceramicizing temperature.

2. The method according to claim 1, wherein the bending radius is in the range between 30 mm and 200 mm.

3. The method according to claim 1, wherein the glass ceramic component has an average thickness between 1 and 20 mm.

4. The method according to claim 1, wherein the glass ceramic component has an average thickness between 2 and 8 mm.

5. The method according to claim 1, further comprising displacing one of the two support plates while pivoting the two support plates.

6. The method of claim 1, further comprising the step of cooling the green glass plate, to form the glass ceramic component.

7. The method of claim 1, wherein the mutually pivoting step takes place when the green glass plate has a viscosity of from 10e12 to 10e7 d Pa s.

8. A method for producing a glass ceramic component, wherein the glass ceramic component comprises two legs, each having a length from 50 mm to 600 mm, a bending radius from 30 mm to 200 mm, and an angle between the two legs from 60° to 150°, the method comprising the steps of:

placing a green glass plate on a shaping tool;

heating the green glass plate during a ceramicizing process; and introducing, using the shaping tool, a shaping force into the green glass plate to bring about the angle, wherein the step of introducing of the shaping force occurs during the heating step of the ceramicizing process and within a process window of the heating step when the glass plate reaches a viscosity state that permits shaping, and wherein the glass plate is in a pre-nucleated state having a crystal-phase fraction between 1 and 10% of the total phase fraction, but before a degree of ceramicizing prevents the shaping.

9. The method according to claim 8, wherein the step of introducing the shaping force comprises mutually pivoting two support plates of the shaping tool while displacing one of the two support plates to simultaneously exercise bending forces into the green glass plate and compressive forces on lengthwise ends of the green glass plate.

10. The method according to claim 8, wherein the glass ceramic component has an average thickness between 1 and 20 mm.

11. The method according to claim 8, wherein the glass ceramic component has an average thickness between 2 and 8 mm.

12. The method according to claim 8, wherein the step of placing the green glass plate on the shaping tool comprises placing an outer side of the green glass plate on an upper side of two support plates and lengthwise ends of the green glass plate set in position by two stops that taking into consideration possible lengthwise expansion due to heating.

13. The method according to claim 12, wherein the step of introducing the shaping force into the green glass plate comprises:

positioning two roller-shaped holders on an upper side of the green glass plate, the two support plates having central lengthwise axes that run along a bending axis; and mutually pivoting the two support plates while maintaining contact between the two support plates and the outer side of the green glass plate with the two stops exercising a compressive force on the lengthwise ends of the green glass plate to form the angle with a bending radius.

14. The method according to claim 13, further comprising displacing one of the two support plates while pivoting the two support plates.

15. A method for producing a glass ceramic component, wherein the glass ceramic component comprises two legs, each having a length from 50 mm to 600 mm, a bending radius from 30 mm to 200 mm, and an angle between the two legs from 60° to 150°, the method comprising the steps of:

placing an outer side of a green glass plate flat on an upper side of two support plates and lengthwise ends of the green glass plate set in position by two stops that taking into consideration possible lengthwise expansion due to heating;

positioning two holders on an upper side of the green glass plate, the two support plates having a central lengthwise axes that run along a bending axis, one of the two support plates coupled to a pivoting bearing which conducts a pivoting movement, and a second of the two support plates coupled to a bearing which conducts a combined pivoting and displacement movement;

heating the green glass plate up during a ceramicizing process to a temperature below a ceramicizing temperature to a viscosity sufficient for deformation;

mutually pivoting the two support plates during the heating step of the ceramicizing process when the viscosity sufficient for deformation has been attained, and wherein the glass plate is in a pre-nucleated state having a crystal-phase fraction between 1 and 10% of the total phase fraction, but below the ceramicizing temperature while maintaining contact between the two support plates and the outer side of the green glass plate by the displacement movement with the two holders exercising a compressive force on the outer side of the green glass plate; and continuing the heating step of the ceramicizing process to heat the green glass plate up to the ceramicizing temperature.

* * * * *